(12) United States Patent
Fang et al.

(10) Patent No.: US 9,970,411 B2
(45) Date of Patent: May 15, 2018

(54) UV-IR COMBINATION CURING SYSTEM AND METHOD OF USE FOR WIND BLADE MANUFACTURE AND REPAIR

(71) Applicant: General Electric Company, Schenectady, NY (US)

(72) Inventors: Xiaomei Fang, Niskayuna, NY (US); Thomas Miebach, Ballston Spa, NY (US); David Simon, Johnston, NY (US); Jordan Philip Seeger, Colonie, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days. days.

(21) Appl. No.: 13/770,092

(22) Filed: Feb. 19, 2013

(65) Prior Publication Data
US 2013/0240118 A1 Sep. 19, 2013

Related U.S. Application Data

(62) Division of application No. 13/248,144, filed on Sep. 29, 2011.

(51) Int. Cl.
*B29C 65/14* (2006.01)
*F03D 1/06* (2006.01)
(Continued)

(52) U.S. Cl.
CPC ........ *F03D 1/0675* (2013.01); *B29C 35/0805* (2013.01); *B29C 70/28* (2013.01);
(Continued)

(58) Field of Classification Search
USPC .................................................... 156/275.5
See application file for complete search history.

(56) References Cited

U.S. PATENT DOCUMENTS

| 3,331,761 A | 7/1967 | Mao |
| 3,450,616 A | 6/1969 | Roger |

(Continued)

FOREIGN PATENT DOCUMENTS

| CN | 1244205 A | 2/2000 |
| EP | 0008127 B1 | 4/1982 |

(Continued)

OTHER PUBLICATIONS

Roy., "Advanced Light Curing Practices for Electronic and Optoelectronic Assembly", 5th Electronics Packaging Technology Conference (EPTC 2003), pp. 751, Dec. 10-12, 2003.

(Continued)

*Primary Examiner* — Michael N Orlando
*Assistant Examiner* — Elizabeth Bradford
(74) *Attorney, Agent, or Firm* — Nitin N. Joshi

(57) ABSTRACT

A UV-IR combination curing system and method for manufacture and repair of composite parts, such as for use in wind blade manufacture and repair. The system and method utilize UV and IR dual radiation sources to cure glass fiber reinforced laminates containing a photo initiator. The UV and IR dual radiation sources can be configured as discrete standalone UV and IR lamps used in a side by side configuration, a plurality of UV lamps with thermal IR radiation, a combined UV/IR lamp, or other forms of light sources providing both UV and IR radiation. To achieve high glass transition and complete curing of thick laminates, the IR radiation source is initially turned on to heat the laminate to close to 40° C.-100° C. before the UV radiation source is turned on. The IR radiation source can be turned off after UV radiation source is activated.

17 Claims, 5 Drawing Sheets

(51) Int. Cl.
  *B29C 35/08* (2006.01)
  *B29C 70/28* (2006.01)
  *B29C 73/34* (2006.01)
  *B29L 31/08* (2006.01)

(52) U.S. Cl.
  CPC ...... *B29C 73/34* (2013.01); *B29C 2035/0822* (2013.01); *B29C 2035/0827* (2013.01); *B29L 2031/08* (2013.01); *Y02E 10/721* (2013.01)

(56) References Cited

U.S. PATENT DOCUMENTS

| | | | |
|---|---|---|---|
| 3,574,040 A | | 4/1971 | Billie et al. |
| 3,619,392 A | | 11/1971 | Wolfgang et al. |
| 4,116,788 A | | 9/1978 | Schmitt et al. |
| 4,132,755 A | | 1/1979 | Johnson |
| 4,182,644 A | | 1/1980 | Briggs et al. |
| 4,230,766 A | | 10/1980 | Gaussens et al. |
| 4,265,723 A | | 5/1981 | Hesse et al. |
| 4,295,907 A | | 10/1981 | Cordts et al. |
| 4,425,287 A | * | 1/1984 | Hesse et al. ............... 264/447 |
| 4,605,465 A | | 8/1986 | Morgan |
| 4,882,201 A | | 11/1989 | Crivello et al. |
| 4,920,164 A | | 4/1990 | Sasaki et al. |
| 4,942,013 A | | 7/1990 | Palmer et al. |
| 5,015,675 A | | 5/1991 | Walles et al. |
| 5,206,077 A | | 4/1993 | Cowley et al. |
| 5,288,767 A | | 2/1994 | Cramer et al. |
| 5,380,775 A | | 1/1995 | Cowley et al. |
| 5,407,972 A | | 4/1995 | Smith et al. |
| 5,500,164 A | | 3/1996 | Livesay et al. |
| 5,554,666 A | | 9/1996 | Livesay |
| 5,554,667 A | | 9/1996 | Smith et al. |
| 5,660,527 A | | 8/1997 | Deering et al. |
| 5,744,557 A | * | 4/1998 | McCormick ............ B32B 27/06 526/171 |
| 5,747,553 A | | 5/1998 | Guzauskas |
| 5,843,354 A | | 12/1998 | Evans et al. |
| 5,854,298 A | | 12/1998 | McNay et al. |
| 5,855,837 A | | 1/1999 | Scranton et al. |
| 5,920,883 A | | 7/1999 | Tamaki et al. |
| 6,171,700 B1 | | 1/2001 | Sugita et al. |
| 6,207,726 B1 | | 3/2001 | Ohtani et al. |
| 6,316,089 B1 | | 11/2001 | Ohtani et al. |
| 6,333,064 B1 | | 12/2001 | Gan |
| 6,345,984 B2 | | 2/2002 | Karmaker et al. |
| 6,387,479 B1 | | 5/2002 | Hayashi et al. |
| 6,454,536 B1 | | 9/2002 | Evans et al. |
| 6,455,111 B1 | * | 9/2002 | Blum et al. ............... 427/498 |
| 6,518,362 B1 | | 2/2003 | Clough et al. |
| 6,599,954 B1 | | 7/2003 | Hayashi et al. |
| 6,602,958 B2 | | 8/2003 | Briggs et al. |
| 6,632,892 B2 | | 10/2003 | Rubinsztajn et al. |
| 6,646,022 B2 | | 11/2003 | Okazaki et al. |
| 6,713,144 B2 | | 3/2004 | Bundo et al. |
| 6,773,855 B1 | | 8/2004 | Iijima et al. |
| 6,800,373 B2 | | 10/2004 | Gorczyca |
| 6,835,759 B2 | | 12/2004 | Bradford et al. |
| 6,852,771 B2 | | 2/2005 | Balch et al. |
| 6,884,841 B2 | | 4/2005 | Nava |
| 7,144,544 B2 | | 12/2006 | Bullock et al. |
| 7,151,123 B2 | | 12/2006 | Weine et al. |
| 7,294,657 B2 | | 11/2007 | Olson et al. |
| 7,329,713 B2 | | 2/2008 | Schorr |
| 7,390,559 B2 | | 6/2008 | Mayo et al. |
| 7,820,248 B2 | | 10/2010 | Wolf et al. |
| 7,927,077 B2 | | 4/2011 | Olson |
| 7,981,944 B2 | | 7/2011 | Weber et al. |
| 8,048,981 B2 | | 11/2011 | Furuta et al. |
| 2003/0126758 A1 | * | 7/2003 | Whipple ............... 34/90 |
| 2004/0115363 A1 | | 6/2004 | Desai et al. |
| 2004/0146694 A1 | | 7/2004 | Green |
| 2004/0147120 A1 | | 7/2004 | Rogalli et al. |
| 2004/0157003 A1 | | 8/2004 | Baumgart et al. |
| 2004/0166241 A1 | | 8/2004 | Gallo et al. |
| 2004/0170119 A1 | | 9/2004 | Watanabe |
| 2004/0211927 A1 | * | 10/2004 | Schmidt ............... 250/504 R |
| 2004/0214912 A1 | | 10/2004 | Rink et al. |
| 2004/0235997 A1 | | 11/2004 | Meisenburg et al. |
| 2005/0025903 A1 | | 2/2005 | Fink et al. |
| 2005/0026069 A1 | | 2/2005 | Yeh |
| 2005/0027074 A1 | | 2/2005 | Lewin et al. |
| 2005/0090620 A1 | | 4/2005 | Grace et al. |
| 2005/0123768 A1 | | 6/2005 | Fischer et al. |
| 2007/0021553 A1 | | 1/2007 | Lichte et al. |
| 2007/0066698 A1 | | 3/2007 | Yang et al. |
| 2009/0148655 A1 | * | 6/2009 | Nies ............... 428/99 |
| 2009/0211173 A1 | * | 8/2009 | Willey ............... B29C 70/222 52/40 |
| 2009/0229747 A1 | | 9/2009 | Olson et al. |
| 2010/0043764 A1 | | 2/2010 | Jones |
| 2010/0095781 A1 | | 4/2010 | Kinlen et al. |
| 2010/0135810 A1 | | 6/2010 | Gorali |
| 2010/0260941 A1 | | 10/2010 | Bushmire et al. |
| 2010/0272574 A1 | | 10/2010 | Lin et al. |
| 2011/0014356 A1 | | 1/2011 | Fornes et al. |
| 2011/0097645 A1 | | 4/2011 | Baak et al. |
| 2011/0243750 A1 | * | 10/2011 | Gruhn ............... B29B 11/16 416/226 |
| 2011/0284150 A1 | * | 11/2011 | Schibsbye ............... B29C 33/68 156/87 |
| 2012/0138223 A1 | | 6/2012 | Fang et al. |
| 2012/0312469 A1 | * | 12/2012 | Stiesdal ............... B29C 33/68 156/289 |

FOREIGN PATENT DOCUMENTS

| | | |
|---|---|---|
| EP | 0249201 A2 | 12/1987 |
| EP | 276501 B1 | 4/1994 |
| EP | 1092744 B1 | 3/2006 |
| EP | 1645607 A1 | 4/2006 |
| EP | 1906242 A1 | 4/2008 |
| JP | 56101846 A | 8/1981 |
| JP | 5872416 A | 4/1983 |
| JP | 2005054107 A | 3/2005 |
| WO | 9422968 A1 | 10/1994 |
| WO | 9712945 A1 | 4/1997 |
| WO | 2098657 A2 | 12/2002 |
| WO | 3018642 A1 | 3/2003 |
| WO | 2003037815 A1 | 5/2003 |
| WO | 03072628 A1 | 9/2003 |
| WO | 03078477 A1 | 9/2003 |
| WO | 2005040295 A1 | 5/2005 |
| WO | 2010128073 A1 | 11/2010 |
| WO | 2011028271 A2 | 3/2011 |
| WO | 2011073107 A1 | 6/2011 |

OTHER PUBLICATIONS

Office Action issued in connection with corresponding DK Application No. PA 2012 70562 dated Aug. 8, 2014.
Unofficial English Translation of Chinese Office Action issued in connection with corresponding CN Application No. 201210368064.8 dated Oct. 26, 2015.
Oystol, "A Guide to Composites and Composite Tooling Fabrication", Spring Semester, 1988.
Corbyn et al., "Fibre Glass Wind Turbine Blade Manufacturing Guide", Engineers Without Borders (EWB—UK) & Sibol ng Agham at Teknolohiya (SIBAT—Philippines), Version 1.4, May 1, 2008.
Reichhold, Inc., "FRP Material Selection Guide an Engineer's Guide to FRP Technology", pp. 1-77, Dec. 31, 2009.
Cripps, "Wind Turbine Blade Repair", Wind Systems, Apr. 2011.
Marsh, "The Challenge of Wind Turbine Blade Repair", Renewable Energy Focus.com, Nov. 7, 2011.
European Search Report and Opinion issued in connection with related EP Application No. 13183940.9 dated Jan. 23, 2014.
U.S. Non-Final Office Action issued in connection with related U.S. Appl No. 13/619,154 dated Oct. 1, 2015.
U.S. Final Office Action issued in connection with related U.S. Appl. No. 13/619,154 dated May 19, 2016.

(56) References Cited

OTHER PUBLICATIONS

Office Action issued in connection with related EP Application No. 13183940.9 dated Mar. 31, 2017.
Goodman, Daniel L. et al.,"Curing and Bonding of Composites using Electron Beam Processing", Preprint of Chapter 11 in the Handbook of Polymer Blends& Composites, A.Kulshreshtha and C. Vasile, eds.,Rapra Technology Ltd, publisher, Shropshire, UK (42 pages).
Koleske, Joseph V., "Dual-Cure Mechanisms", Ch. 9 in Radiation Curing of Coatings, ASTM International (ASTM stock #: MNL45); pp. 155-164.
"Graco Dispensing Equipment for Wind Turbine Blade Manufacturing", Wind Energy—Rotor Blades.

* cited by examiner

| Ply # | Tg (°C) | Ply # | Tg (°C) | Ply # | Tg (°C) |
|---|---|---|---|---|---|
| 1(top) | 58.2 | 1(top) | 106.5 | 1&2(top) | 128.7 |
| 2 | 58.3 | 2 | 116.1 | 3 | 127.1 |
| 3 | 55.4 | 3 | 104.5 | 4 | 126.4 |
| 4 | 50.1 | 4 | 84.1 | 5 | 125.2 |
| 5 | 41.0 | 5 | 68.1 | 6 | 124.8 |
| 6 | 42.1 | 6 | 55.3 | 7 | 124.4 |
| 7 | 45.8 | 7 | 52.3 | 8 | 125.8 |
| 8 | 44.8 | 8 | 38.9 | 9 | 121.9 |
| 9 | 38.4 | 9 | 42.0 | 10 (buttom) | 123.7 |
| 10 (buttom) | 37.1 | 10 (buttom) | 42.7 | | |

UV-IR COMBINATION CURING SYSTEM AND METHOD OF USE FOR WIND BLADE MANUFACTURE AND REPAIR

BACKGROUND

Embodiments presented herein relate generally to curing techniques for composite materials, and more particularly, to curing techniques for use in manufacturing and repairing damage to structural composite products, such as wind turbine rotor blade laminates.

Wind turbines have received increased attention as environmentally safe and relatively inexpensive alternative energy sources. With this growing interest, considerable efforts have been made to develop manufacturing and repair techniques for wind turbines that are reliable and efficient.

Generally, a wind turbine includes a rotor having multiple blades. The rotor is mounted to a housing or nacelle, which is positioned on top of a truss or tubular tower. Utility grade wind turbines (i.e., wind turbines designed to provide electrical power to a utility grid) can have large rotors (e.g., 30 or more meters in length) and generally have an average wind turbine rotor blade size of 24 meters to 47 meters in length (80-155 feet). In addition, the wind turbines are typically mounted on towers that are at least 60 meters in height. Blades on these rotors transform wind energy into a rotational torque or force that drives one or more generators. Wind turbine rotor blade designs have become increasingly complex to maximize aerodynamic properties and to withstand a variety of environments and conditions.

A wind turbine cannot generate electricity without the wind turbine rotor blades. Generally, wind turbine rotor blades are fabricated from composite fiber materials and matrices, composed of multiple layers or plies. In many instances, if certain material failures occur in the wind turbine rotor blade, the wind turbine may be taken off-line and the wind turbine rotor blade must be replaced or repaired. The costs and time associated with transportation of replacement blades and the installation of the replacement blades is very high. Current methods used to repair wind turbine rotor blades are time and labor intensive and require special repair methods and facilities, as such, fabrication and repair of wind turbine rotor blades is difficult and expensive.

One conventional approach utilized in both manufacture and repair of wind turbine blades involves curing multiple layers, wherein all of the layers are cured together at the same time in an autoclave or oven. In other words, the process involves applying the layers one over the other, and then subsequently curing all of the layers. The adhesion between layers is generally good but other disadvantages sometimes make this approach impractical. For instance, in manufacturing or repairing the root section of a wind turbine blades, sagging and dimensional distortion and fiber wrinkling during compaction may occur during the curing cycle. Also, excessive reaction exotherm from thick parts may cause problems. Another approach for curing these multiple layers involves sequentially applying and completely curing layers one after another using a single curing mechanism. In other words, a first composite layer is cured completely before laying down a second composite layer. The second composite layer is then cured completely before laying down a third composite layer. The process adds additional composite layers in the same sequential manner using the single curing mechanism. Unfortunately, this fabrication technique creates relatively weak secondary adhesive bonds between the composite layers. These secondary adhesive bonds result in undesirably low interlaminar strength.

In alternate situations, in-field repair, including up-tower repair is feasible. In these instances, a thermal blanket heating process may be utilized, requiring a green cure and an extended long post-curing process in order to achieve the desired physical and mechanical properties. The up-tower time required for a long thermal curing process contributes significant man-hour cost for wind blade repair processes. UV curing may provide faster laminate curing as an efficient in-field repair process, however, UV curing processes alone have been limited to thin laminate curing only. It is widely known that UV curing processes alone cannot achieve high glass transition, and full curing of thick composite laminates.

Hence, an improved technique needs to be developed to address the aforementioned manufacture and repair process issues.

BRIEF DESCRIPTION

In accordance with one aspect of the invention, a manufacturing or repair system includes a first radiation source configured to heat a plurality of layers of a composite structure throughout a thickness of the plurality of layers of the composite structure to form a plurality of pre-heated layers of a composite structure and a second radiation source configured to cure the plurality of pre-heated layers of the composite structure through a thickness of the composite structure.

In accordance with another aspect of the invention, a manufacturing or repair system includes a composite structure, including a first layer comprising a reinforced resin having a reactive group and a photoinitiator and a plurality of successive layers comprising the reinforced resin having the reactive group and the photoinitiator. The first layer and the plurality of successive layers are configured in a stack. The system further includes a first radiation source configured to heat the first layer and the plurality of successive layers of the composite structure throughout a thickness of the plurality of layers of the composite structure to form a plurality of pre-heated layers of a composite structure and a second radiation source configured to cure the plurality of pre-heated layers of the composite structure through a thickness of the plurality of pre-heated layers of composite structure and form a covalent bond across an interface of the first layer and an adjacent successive layer and a plurality of additional covalent bonds across additional interfaces of the plurality of successive layers.

In accordance with another aspect of the invention, a method includes providing a first layer of a reinforced resin having a reactive group and a photoinitiator included therein. Next, additional successive layers of the reinforced resin having the reactive group and the photoinitiator are provided on top of the first layer. A first radiation source is provided and applied to preheat the first layer and the additional successive layers throughout a thickness of the layers. A second radiation source is next applied to cure the preheated first layer and the plurality of additional successive layers simultaneously throughout a thickness of the layers.

Various refinements of the features noted above exist in relation to the various aspects of the present invention. Further features may also be incorporated in these various aspects as well. These refinements and additional features may exist individually or in any combination. For instance, various features discussed below in relation to one or more of the illustrated embodiments may be incorporated into any of the above-described aspects of the present invention alone or in any combination. Again, the brief summary presented above is intended only to familiarize the reader with certain aspects and contexts of the present invention without limitation to the claimed subject matter.

DRAWINGS

These and other features, aspects, and advantages of the present invention will become better understood when the following detailed description is read with reference to the accompanying drawings in which like characters represent like parts throughout the drawings, wherein.

Figures 6, 7, 8, 9:
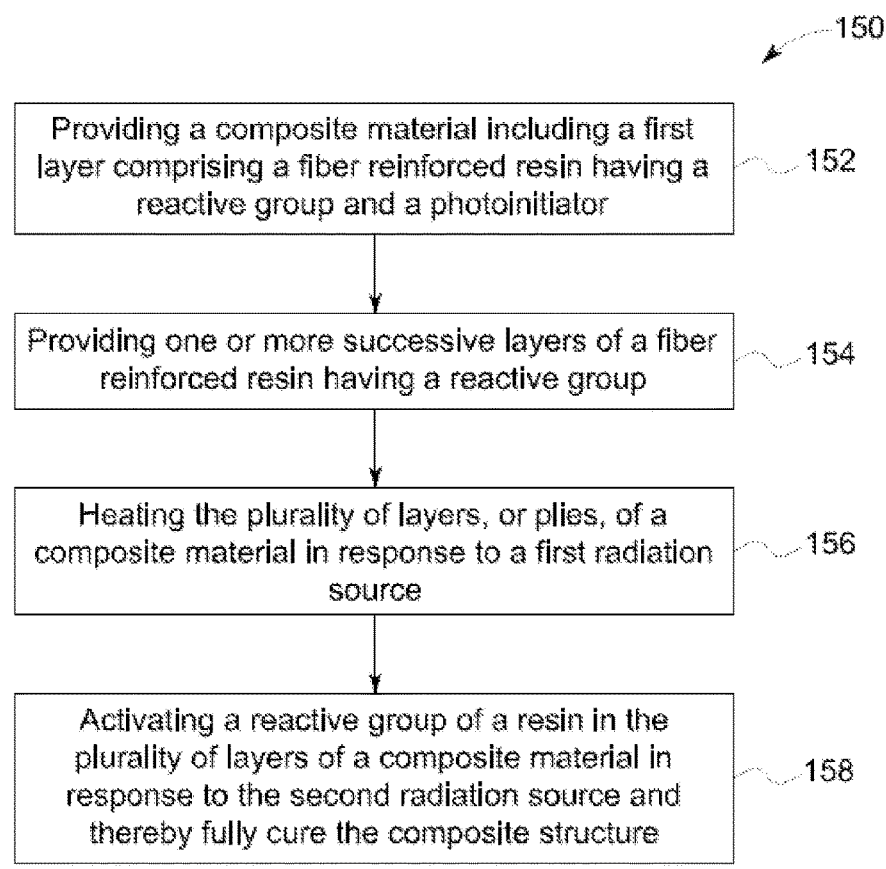
FIG. 6 is a flow chart illustrating exemplary steps for a method of repairing a composite structure using a combination UV-IR manufacturing and repair system in accordance with certain embodiments disclosed herein.
Figure 10:
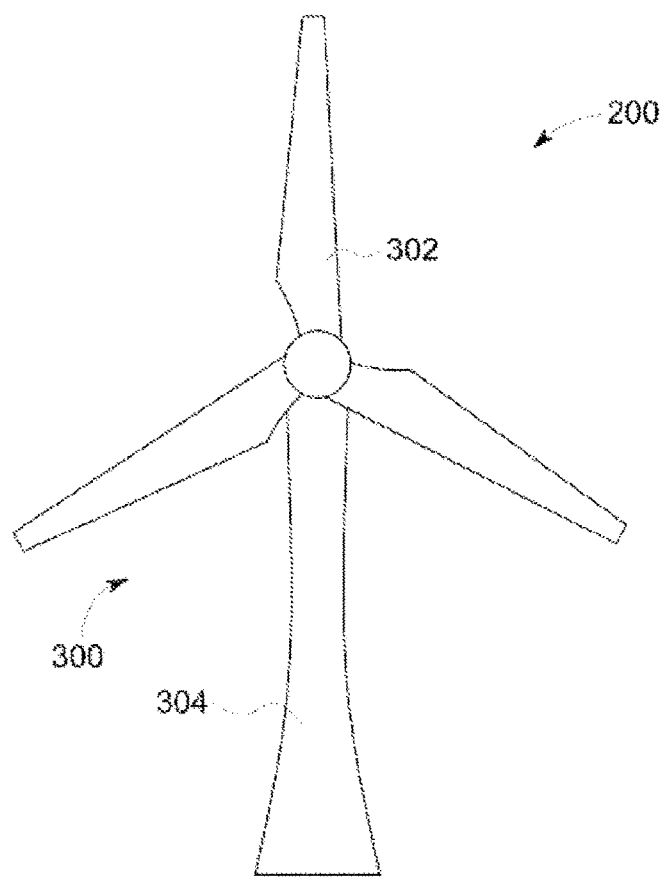
Figure 11:
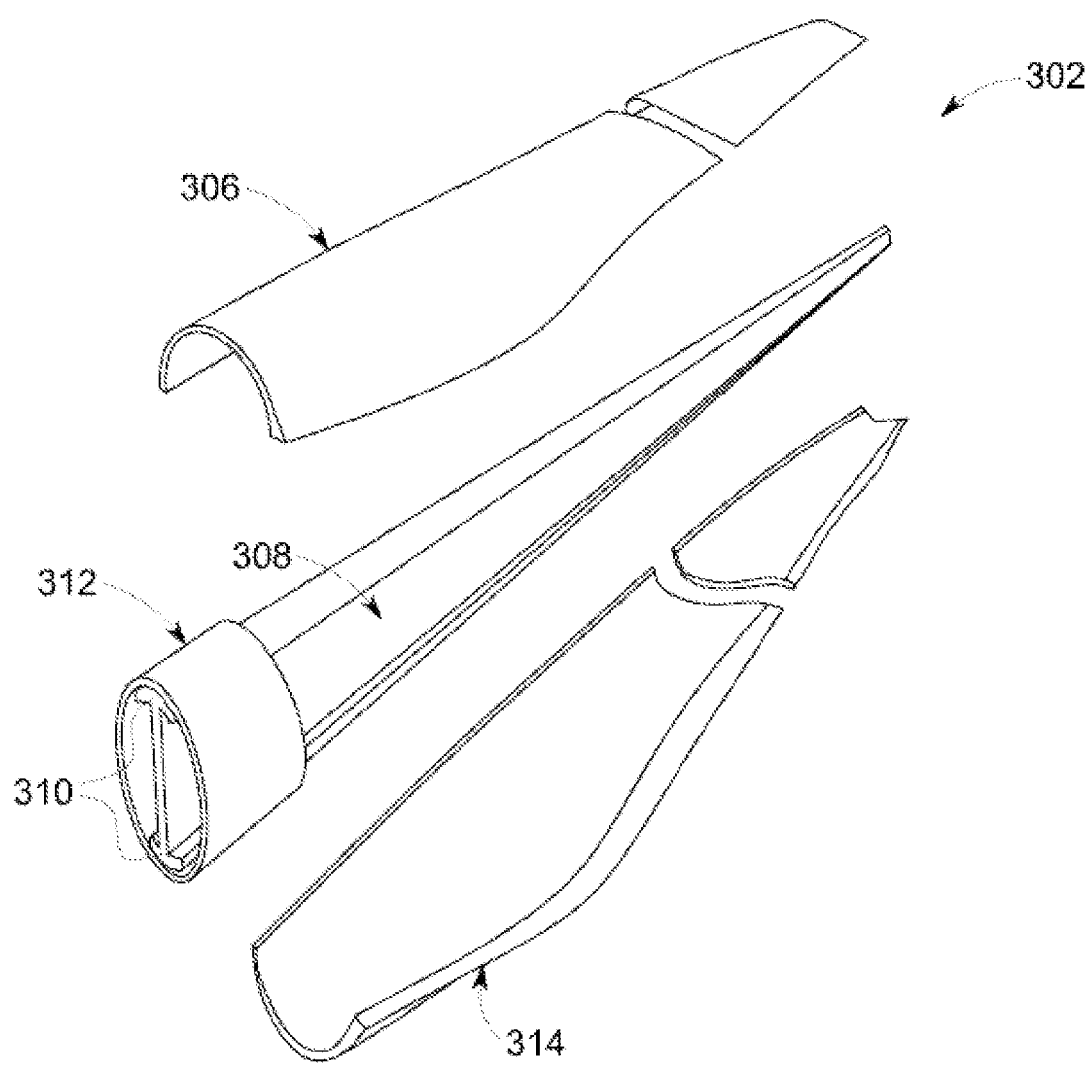

FIG. 7 presents a data table showing comparative glass transition temperature profiles for composite layers when using a UV cure source in a UV manufacturing and repair system;

FIG. 8 presents a data table showing comparative glass transition temperature profiles for composite layers when using a high intensity UV cure source in a UV manufacturing and repair system;

FIG. 9 presents a data table showing comparative glass transition temperature profiles for composite layers when using a combined UV-IR cure source in a combined UV-IR manufacturing and repair system according to certain embodiments disclosed herein;

FIG. 10 is a diagrammatical illustration of an exemplary embodiment of a composite structure used in a wind turbine system comprising blades manufactured or repaired in accordance with embodiments disclosed herein; and FIG. 11 is a diagrammatical illustration of the blades manufactured or repaired in the wind turbine system, such as illustrated in FIG. 7, in accordance with certain embodiments disclosed herein.

DETAILED DESCRIPTION

As discussed in detail below, embodiments presented herein provide a combination UV-IR cure source manufacturing and repair system for composite structures and a method of manufacturing and repairing a composite structure using a combination UV-IR cure system. A composite structure used herein is defined as a structure having multiple composite layers, or plies, wherein the composite structure is manufactured and/or repaired using a combined UV-IR curing source to bond the multiple layers. The multiple composite layers comprise at least one filler or fiber, a curable monomer and at least one photoinitiator. In the specification and the claims which follow, singular forms "a", "an" and "the" include plural referents unless the context clearly dictates otherwise. The term "combined" modes as used herein, are modes of manufacture or repair in which initially, a plurality of material layers forming the composite structure are heated by a heating step using a first radiation source followed by a curing step to entirely cure the composite structure utilizing a second radiation source, wherein the first radiation source emits an infrared frequency radiation and the second radiation source emits an ultraviolet frequency radiation. The combined heating and curing modes used in the combination UV-IR cure system and method of manufacture and repair, results in uniform curing throughout the multiple layers, creation of covalent bonds across interface of the multiple layers, and optimizes high glass transition temperatures across the multiple layers.

Rapid and thorough curing systems are desirable for large composite structures to obtain the desired manufacturing or repair cycle time, reduce significant plant and equipment investment, and further decrease cost in manufacture and repair of a composite part. This requires integration of appropriate resin chemistry with a corresponding curing source. In a system and method disclosed herein, for composite structures, dual radiation sources are introduced in combination with a UV sensitive initiator that will enable curing of the composite materials and result in complete curing through an entire thickness of the composite material. The dual radiation sources disclosed herein include a first radiation source configured to emit an infrared frequency radiation and a second radiation source configured to emit an ultraviolet frequency radiation.

Figure 1:
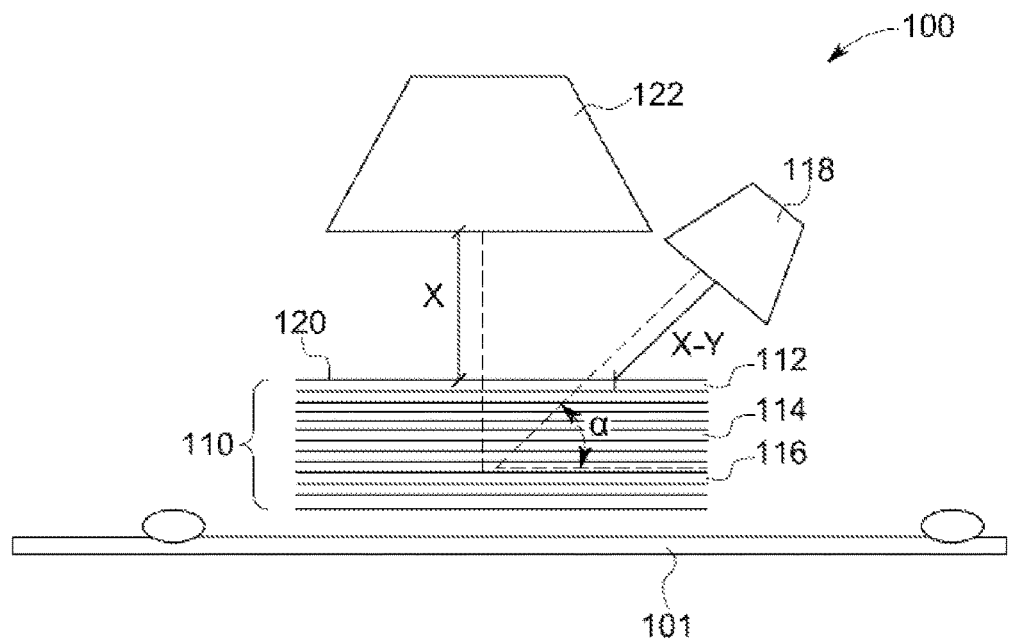
FIG. 1 is a diagrammatical illustration of an exemplary embodiment of the combination ultraviolet (UV)-infrared (IR) manufacturing and repair system in accordance with an embodiment disclosed herein.

Referring now to the drawings, in which like numerals refer to like elements throughout the several views, and in particular FIG. 1, illustrated is a diagrammatical illustration of an exemplary embodiment of the combination ultraviolet (UV)-infrared (IR) manufacturing and repair system 100 in accordance with an embodiment disclosed herein. More particularly, illustrated is system 100 wherein positioned therein is a composite structure 110. The composite structure 110 is illustrated including a plurality of layers, or plies, 112, of a fiber reinforced resin or another material in accordance with embodiments. As used herein, "resin" includes a resin or a resin blend. In alternative embodiments, the composite structure 110 may include two or more layers, or plies, of another type of material. The plurality of layers of a composite material 112 include a reactive group. As used herein, the "reactive group" is defined as an atom or a group of atoms in an organic compound that provides the compound with some of its characteristics which make it respond to a specific curing mechanism. Some non-limiting examples of reactive groups include aldehydes, amines, hydroxyl, acrylate, methacrylate, vinyl, cyclo-epoxide, glycidyl etherepoxide with amine curatives, urethane, thiol-ene reactive group or a combination thereof. Some non-limiting examples of resins comprising these reactive groups are unsaturated polyesters, vinyl esters, melamines, urea-formaledehydes, phenolics, methacrylates, acrylates, epoxies, urethanes, etc.

In a preferred embodiment, a plurality of layers of a composite material 112 are disposed in a stacked configuration and subsequent to curing, are bonded by a covalent bond formed at an interface 114 between adjacent layers, of the plurality of layers of a composite material 112. As previously disclosed, the composite structure 110 includes a plurality of layers, or plies, 112, of a fiber reinforced resin or another material. In particular embodiments, the fiber material generally comprises a reinforcing fiber or filler, such as, but not limited to, a fiber having high strength. The strength of the fibers may be further increased by using techniques known in the art, such as, but not limited to, forming a plurality of layers or plies, by orientation of the fibers in a direction, and like methods. The fibers may be made available in any conventional form such as, braided, unidirectional, woven fabric, knitted fabric, swirl fabric, felt mat, wound, and the like. Exemplary fibers that may be advantageously used comprise glass fibers (e.g. quartz, E-glass, S-2 glass, R-glass from suppliers such as PPG, AGY, St. Gobain, Owens-Corning, or Johns Manville). The fibers are at least partially UV transparent fibers such as, but not limited to, glass, quartz, silica, fumed silica, alumina, zirconium oxide, nanoparticles, and the like. Mixtures of more than one fiber are also within the scope of this disclosure The fiber is typically present in the composition of the composite material in a range of from about 1% to about 90%, and more typically in a range of from about 10% to about 80% by weight, based on the total weight of composition. More preferably, the fiber is present in a range of from about 45% to about 75% by weight, based on the total weight of the composition.

In a non-limiting example, the plurality of layers of a composite material 112 may include a plurality of fibers forming at least one composite fabric ply, including a curable monomer, or resin material. The resin material may be applied to the composite fabric by pre-impregnating into the fabric layer (e.g., pre-preg fabric), and more particularly, by infusing the resin material into the fabric layer via vacuum-assisted resin transfer molding (VaRTM), resin transfer molding (RTM), or the like, or by brushing or rolling the resin onto the surface of the fabric layer until the resin material is absorbed.

In some embodiments, the plurality of layers of a composite material 112 typically comprise monomers having at least one ethylenic unit, cyclic ether unit, or epoxide unit, oxetane unit, or the like, or combinations thereof. In other embodiments, the compositions typically comprise monomers having at least one isocyanate unit, ester unit, or the like, or combinations thereof. Suitable curable monomers, or resin materials, include, but are not limited to unsaturated polyester such as POLYLITE® polyester resin available from Reichhold, SYNOLITE® polyester resin available from DSM, AROPOL® polyester resin available from Ashland; vinyl esters such as DION®, NORPOL® and HYDREX® resins available from Reichhold, DERAKANE®, DERAKANE MOMENTUM® and HETRON® resins available from Ashland, ATLAC E-NOVA® resin available from DSM; acrylates, diacrylates, dimethacrylates, multi-functional acrylates and multi-functional methacrylates such as polyester acrylates, epoxy acrylates and urethane acrylates, and the like, available from such companies as Cytec Surface Specialties, Sartomer, Rahn, and BASF, and polyvinyl, melamines, urea-formaledehydes, phenolics. The curable monomer is typically present in a range of from about 90% by weight to about 10% by weight, based on the total weight of the composition, and more preferably, in a range of from about 80% by weight to about 20% by weight, based on the total weight of the composition.

Suitable resins comprising at least one cyclic ether unit comprise aliphatic epoxy resins, cycloaliphatic epoxy resins such as ERL-4221, CYRACURE™ UVR-6110, CYRACURE™ UVR-6107, and CYRACURE™ UVR-6105 from Dow Chemical Company and UVACURE® 1500 from Cytec Surface Specialties; bisphenol-A epoxy resins, bisphenol-F epoxy resins, phenol novolac epoxy resins, cresolnovolac epoxy resins, biphenyl epoxy resins, multi-functional epoxy resins (i.e. epoxy resins comprising two or more epoxy groups), naphthalene epoxy resins (e.g., EPICLON® EXA-4700 from Dainippon Ink and Chemicals), divinylbenzene dioxide, 2-glycidylphenylglycidyl ether, dicyclopentadiene-type epoxy resins (e.g., EPICLON® HP-7200 from Dainippon Ink and Chemicals), multi-aromatic resin type epoxy resins, or the like, or combinations thereof. All of these classes of epoxy resins are known in the art and are widely available and preparable by known methods.

In one embodiment, one or more photoinitiators are included in the plurality of layers of a composite material 112 to generate free radicals when exposed to radiation of wavelength at which the photoinitiator is active. In other embodiments suitable photoinitiators generate acid (photoacid generators, or PAGs) when exposed to radiation of wavelength at which the photoinitiators are active. Different types of photoinitiators can be used alone or as mixtures. In a particular embodiment a photoacid generator can be used together with a radical photoinitiator to initiate the curing of cationic curable monomers. Suitable photoinitiators include, but are not limited to, organic peroxides, azo compounds, quinones, benzophenones, nitroso compounds, acryl halides, hydrazones, mercapto compounds, pyrylium compounds, triacrylimidazoles, bisimidazoles, chloroalkyltriazines, benzoin ethers, benzil ketals, thioxanthones, acetophenones, acylphosphine oxides, derivatives of the aforementioned compounds, and mixtures thereof. Exemplary photoinitiators comprise: benzil ketals such as 2,2-dimethoxy-2-phenyl acetophenone (available from Ciba Specialty Chemicals under the trademark IRGACURE® 651); acetophenone derivatives such as 2,2-diethoxyacetophenone ("DEAP", available from First Chemical Corporation); 2-hydroxy-2-methyl-1-phenyl-propan-1-one ("HMPP", available from Ciba Specialty Chemicals under the trademark DAROCUR™ 1173); 2-benzyl-2-N,N-dimethylamino-1-(4-morpholinophenyl)-1-butanone (available from Ciba Specialty Chemicals under the trademark IRGACURE™ 369); 2-methyl-1-(4-(methylthio)phenyl)-2-morpholinopropan-1-one (available from Ciba Specialty Chemicals under the trademark IRGACURE® 907); or acylphosphine oxides such as 2,4,6-trimethylbenzoyl diphenylphosphine oxide ("TPO"), bis(2,6-dimethoxybenzoyl)-2,4,4-trimethylpentylphosphine oxide ("DMBAPO"), or bis(2,4,6-trimethylbenzoyl)-phenylphosphine oxide ("BTBPPO"). BTBPPO is available from Ciba Specialty Chemicals under the trademark IRGACURE® 819; DMBAPO is available from Ciba Specialty Chemicals in the form of blends with other ketones including: 25/75 wt % blend with HMPP as IRGACURE® 1700, and 1-hydroxy-cyclohexyl-phenyl-ketone, (or HCPK) as IRGACURE® 1850 or 1800 depending on proportions. TPO is also available from Ciba Specialty Chemicals in 50/50 wt % blends with HMPP (as IRGACURE® 4265). In a preferred embodiment, photoinitiators used are acylphosphine oxide type, most preferably IRGACURE® 819 available from Ciba Specialty Chemicals. Photoinitiators which generate acid when exposed to radiation of wavelength at which the photoinitiators are active include, but are not limited to, onium salts, aryl sulfonium and aryl iodonium salts of weakly basic anions, such as hexafluorophosphate or hexafluoroantimonate. Some particular examples comprise (4-(octyloxy)phenyl)phenyliodonium hexafluoroantimonate (OPPI) available from Hampford Research, triarylsulfonium hexafluorophosphate; [4-[(2-hydroxytetradecyl)oxy]phenyl]phenyliodonium hexafluoroantimonate available from Aldrich; UVACURE® 1600 from Cytec Surface Specialties, IRGACURE® 250 from Ciba Specialty Chemicals, IGM-C445 from IGM Resins, Inc., Bartlett, Ill.; CYRACURE™ UVI6992 and CYRACURE™ UVI6976 from Dow Chemicals; ESACURE® 1064 and ESACURE® 1187 from Lamberti; R-gen 1130, R-gen BF1172, CHIVACURE® 1176 and CHIVACURE® 1190 from Chitec, and ferrocenium salts such as IRGACURE® 261 from Ciba Specialty Chemicals.

Suitable amounts of photoinitiator are in a range of from about 0.01% to about 20%, preferably in a range of from about 0.1% to about 10%, and most preferably in a range of from about 0.5% to about 5% by weight, based on the weight of the curable monomer.

In the embodiment illustrated in FIG. 1, the combination ultraviolet (UV)-infrared (IR) manufacturing and repair system is generally referenced 100. Shown positioned within the system 100, and upon a supporting substrate 101, are the plurality of layers of a composite material 112, wherein each layer, or ply, comprises a glass fiber reinforced composite material 116. More specifically, in this particular embodiment, the plurality of layers of a composite material 112 are comprised of glass fiber reinforced vinyl ester containing a photoinitiator. The system 100 includes, a first radiation source 118 positioned a distance "x-y" from an uppermost layer 120 of the plurality of layers of a composite material 112. More particularly, as illustrated, the first radiation source 118 is positioned to emit radiation at an angle "a" relative to an uppermost layer 120 of the plurality of layers of composite material 112, wherein α is between approximately 30-90° degrees. The first radiation source 118 is used to initiate heating of the plurality of layers of a composite material 112. In the embodiment illustrated in FIG. 1, the first radiation source 118 is comprised of a radiation source capable of emitting radiation having a wavelength in the range of from about 700 nm to 1 μm. More particularly, the first radiation source 118 is capable of emitting infrared radiation, wherein suitable sources include infrared incandescent lamps, infrared quartz tubes, infrared light emitting diodes, infrared light emitting lasers, and the like.

A second radiation source 122 is provided and positioned substantially perpendicular to the uppermost layer 120 and at a distance 'x' from the uppermost layer 120 of the plurality of layers of a composite material 112. The second radiation source 122 is used to initiate photocuring of the reactive group contained within the plurality of layers of a composite material 112. In the embodiment illustrated in FIG. 1, the second radiation source 122 is comprised of a radiation source, capable of emitting radiation having a wavelength in the range of from about 100 to 400 nanometers. More particularly, the second radiation source 122 is capable of emitting ultraviolet light, wherein suitable sources includes ultraviolet fluorescent lamps, ultraviolet light emitting diodes, ultraviolet light emitting lasers, and the like.

FIG. 1 illustrates applying the first radiation source 118 (IR) to heat the plurality of layers, or plies, 112 of the composite material. During operation, the first radiation source 118 is turned on to heat the plurality of layers, or plies, 112 of the composite material to a temperature between 40-100° C. When the plurality of layers 112 reach the desired temperature, the second radiation source 122 (UV) is turned on to initiate photo curing of the reactive group contained therein the plurality of layers 112 according to the embodiment described in FIG. 1. Upon activation of the second radiation source 122, the first radiation source 118 may be turned off.

Upon exposure to the second radiation source 122, the photoinitiator dissociates to give rise to free radicals or acid, which then initiate the curing of the photocurable monomer. The time of exposure of the composition to radiation and the intensity of the radiation may vary greatly. In various embodiments the time of exposure to radiation or the intensity of the radiation or both are sufficient to initiate photocuring. In particular embodiments the time of exposure is generally in the range of from about 1 second to about 5 hours, more preferably in the range of from about 5 seconds to about 1 hour. These parameters may be readily determined by one skilled in the art. In one embodiment variations in the intensity of radiation and time of exposure of the composition may be employed to control the time taken to initiate curing.

In some embodiments the composition is exposed to the radiation for a time period sufficient to complete curing. The second radiation source 122 may be turned off before complete curing of the resin is achieved. No other outside energy source need be employed to provide curing of the composition after the second radiation source 122 is turned off. The use of dual radiation sources to achieve curing throughout the thickness of the composite layer, or plies, results in significant reduction in energy usage, thus giving rise to a cost effective process.

It is anticipated by this disclosure that the dual radiation sources could be stand-alone UV and IR lamps used side by side and configured as described previously with respect to FIG. 1, stand-alone UV and IR lamps used side by side and configured as described with respect to FIG. 2, below, or combined UV/IR lamps, or other forms of light sources providing both UV and IR radiation, combined into a single light source or housing, such as described below with respect to FIG. 3.

It is additionally anticipated by this disclosure that the disclosed UV-IR curing method disclosed herein may be used as a stagewise curing process to build up thickness as needed. For example, a 10-ply of composite laminate may be cured first using UV-IR dual curing process, and then another 10-ply of composite laminate is cured on top of the first-set of cured 10-layer laminate, thus a 20-layer cured composite is built up.

Figure 2:
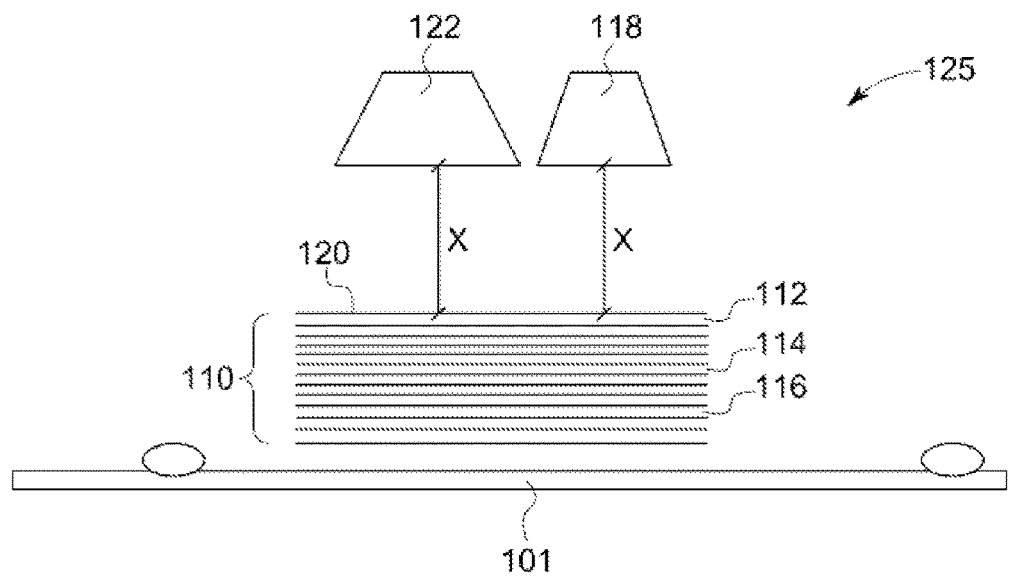
FIG. 2 is a diagrammatical illustration of another exemplary embodiment of the combination UV-IR manufacturing and repair system in accordance with an embodiment disclosed herein.

Referring now to FIG. 2, illustrated is an alternate embodiment of a combination ultraviolet (UV)-infrared (IR) manufacturing and repair system, generally referenced 125. In this particular embodiment, shown positioned within the system 125, and upon a supporting substrate 101, are the plurality of layers of a composite material 112, wherein each layer, or ply, comprises a fiber reinforced composite material. The system 125 includes, a first radiation source 118 positioned substantially perpendicular, and at a distance "x" from an uppermost layer 120 of the plurality of layers of a composite material 112. Similar to the previous embodiment, the first radiation source 118 is comprised of a radiation source capable of emitting radiation having a wavelength in the range of from about 700 nm to 1 μm. A second radiation source 122 is provided and positioned in a side-by-side relationship with the first radiation source 118 and positioned substantially perpendicular to the uppermost layer 120 and at a distance "x" from the uppermost layer 120 of the plurality of layers of a composite material 112. Similar to the previously described embodiment, in the embodiment illustrated in FIG. 2, the second radiation source 122 is comprised of a radiation source, capable of emitting radiation having a wavelength in the range of from about 100 to 400 nanometers.

Figure 3:
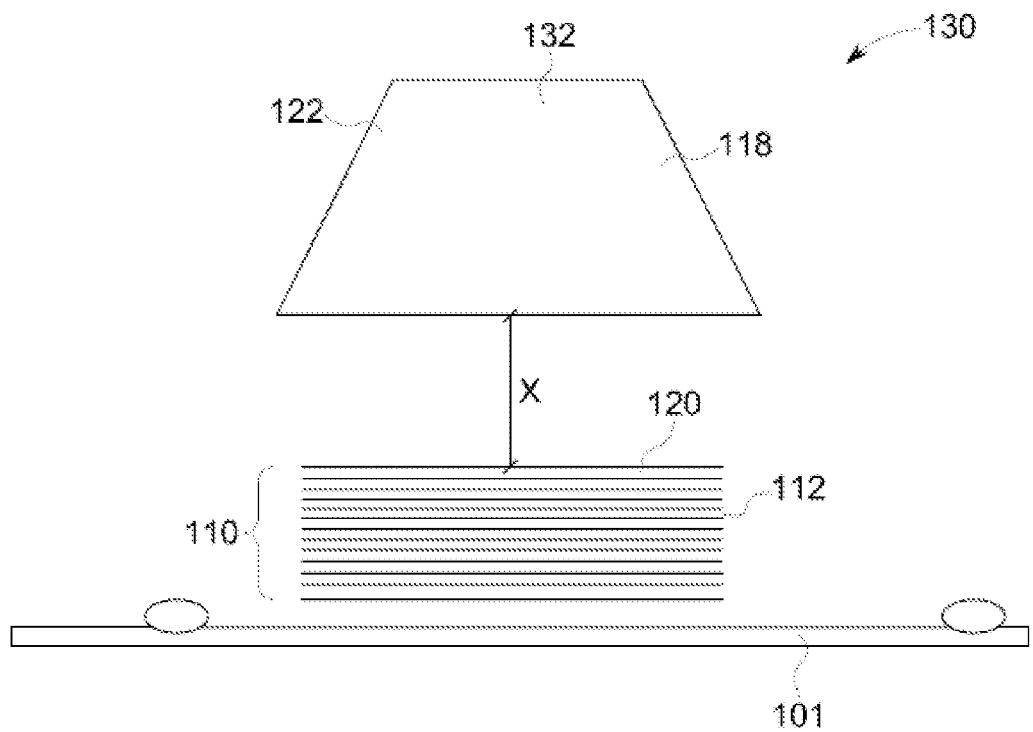
FIG. 3 is a diagrammatical illustration of yet another exemplary embodiment of the combination UV-IR manufacturing and repair system in accordance with an embodiment disclosed herein.

Referring now to FIG. 3, illustrated is an alternate embodiment of a combination ultraviolet (UV)-infrared (IR) manufacturing and repair system, generally referenced 130. As previously stated, like numerals refer to like elements throughout the several views. Illustrated in FIG. 3 are the plurality of layers of a composite material 112 positioned within the system 130 and upon a substrate 101. Each of the plurality of layers of a composite material 112 comprises a fiber reinforced composite material. More specifically, in one embodiment, the plurality of layers of a composite material 112 are each comprised of glass fiber reinforced epoxy containing a photoinitiator. In this particular embodiment, and in contrast to the previous embodiments described with reference to FIGS. 1 and 2, provided are a first radiation source 118 and a second radiation source 122 configured in combination as a combined radiation source 132. As previously stated, the combined radiation source 132 can be either configured as combined UV/IR lamps, or other forms of light sources providing both UV and IR radiation or discrete UV and IR radiation sources combined into a single housing as described and illustrated below with reference to FIGS. 4 and 5. The combined radiation source 132 is provided and positioned a distance "x" from an uppermost layer 120 of the plurality of layers of a composite material 112. The first radiation source 118, configured as a part of the combined radiation source 132, is used to initiate heating of the plurality of layers of a composite material 112. The first radiation source 118 is comprised of a radiation source capable of emitting radiation having a wavelength in the range of from about 700 nm to 1 μm. More particularly, the first radiation source 118 is capable of emitting infrared radiation, wherein suitable sources include infrared incandescent lamps, infrared quartz tubes, infrared light emitting diodes, infrared light emitting lasers, and the like. The second radiation source 122 is used to initiate photocuring of the reactive group contained within the plurality of layers of a composite material 112. In the embodiment illustrated in FIG. 3, the second radiation source 122 is comprised of a radiation source, capable of emitting radiation having a wavelength in the range of from about 100 to 400 nanometers. More particularly, the second radiation source 122 is capable of emitting ultraviolet light, wherein suitable sources include ultraviolet fluorescent lamps, ultraviolet light emitting diodes, ultraviolet light emitting lasers, and the like.

Similar to the embodiments illustrated in FIGS. 1 and 2, the combined radiation source 132 provides for initial application of the first radiation source 118 (IR) to heat the plurality of layers, or plies, 112 of the composite material. More specifically, during curing of the composite material, the first radiation source 118 is turned on to heat the plurality of layers, or plies, 112 of the composite material to a temperature between 40-100° C. When the plurality of layers 112 reach the desired temperature, the second radiation source 122 (UV) is turned on to initiate photo curing of the reactive group contained therein the plurality of layers 112. As previously described, in contrast to the embodiments described with reference to FIGS. 1 and 2, the first radiation source 118 and the second radiation source 122 as presented in this embodiment, are configured as a combined radiation source 132, that is capable of operating as described above.

Figures 4, 5:
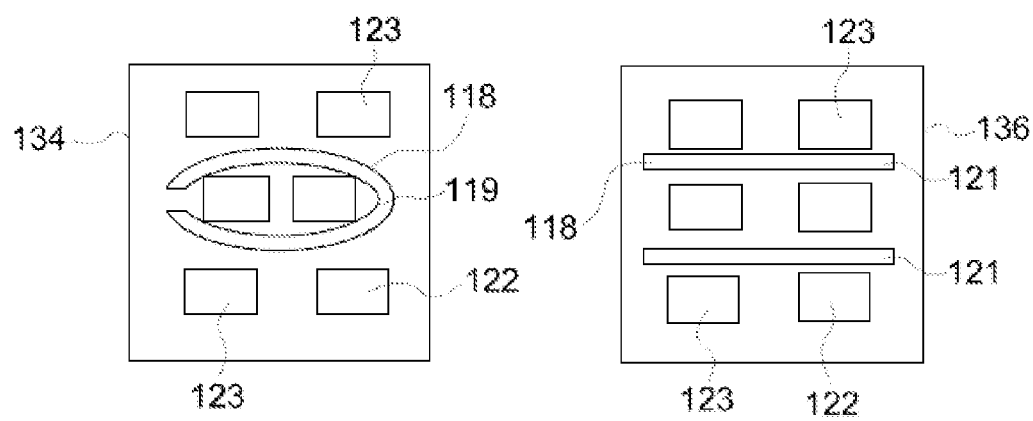
FIG. 4 illustrates in schematic cross-section view taken through a combined radiation source, an alternative UV-IR lamp configuration in accordance with an embodiment disclosed herein.
FIG. 5 illustrates in schematic cross-section view taken through a combined radiation source, an alternative UV-IR lamp system in accordance with an embodiment disclosed herein.

Referring now to FIGS. 4 and 5, illustrated are combined radiation sources, generally similar to the combined radiation source 132 previously described with reference to FIG. 3. In the illustrated embodiment, discrete UV and IR radiation sources are configured in a single housing. It should be understood that the layout of the radiation sources depicted in FIGS. 4 and 5 are merely exemplary, and that additional layouts or configurations are anticipated. Referring specifically to FIG. 4, illustrated is a combined radiation source 134 including a first radiation source (IR) 118 configured as a circular IR heating lamp 119. Additionally, included is a second radiation source 122 configured as a plurality of individual UV lamps 123. The lamps 119 and 123 are housed within a single housing and configured for operation as previously described. Referring specifically to FIG. 5, illustrated is a combined radiation source 136 including a first radiation source (IR) 118 configured as a multiple strip-like IR heating lamps 121. Additionally, included a second radiation source 122 configured as a plurality of individual UV lamps 123. The lamps 121 and 123 are housed within a single housing and configured for operation as previously described.

FIG. 6 illustrates a method 150 of curing a composite structure 110 in accordance with certain embodiments of the present invention. The method 150 includes providing a composite material including a first layer comprising a fiber reinforced resin having a reactive group and a photoinitiator as step 152. The method further includes providing one or more successive layers of a fiber reinforced resin having a reactive group as step 154 until the desired number of layers in the resultant composite structure 110 have been provided. The method further includes heating the plurality of layers, or plies, of a composite material in response to a first radiation source at step 156. The method further includes activating a reactive group of a resin in the plurality of layers of a composite material 112 in response to the second radiation source at step 158, thereby simultaneously curing the plurality of layers of a composite material 112. Following activation of the second radiation source 112, the first radiation source 118 may be turned off. During exposure to the second radiation source 122, the reactive group (as previously described) of the plurality of layers of a composite material 112 (as referenced to in FIGS. 1 and 2), and more specifically, the composite structure 110 may be fully cured. As previously alluded to, if stagewise curing is desired to build up thickness of a composite structure or part, the process may be repeated, wherein a first set of a plurality of layers of a composite material 112 may initially be cured according to the method 150 and then an additional set of a plurality of layers of a composite material 112 may be cured on top of the first set, to build up a composite laminate structure as desired.

FIG. 7 illustrates a temperature profile of a composite material, comprised of a plurality of layers, or plies, as indicated, generally similar to composite structure 110 of FIGS. 1-3. In this particular table, generally referenced 160, instead of a combined radiation source as disclosed herein, only a single UV radiation source was utilized for curing of the plurality of layers or plies. Specifically, illustrated in FIG. 7 is data reflecting UV curing of glass fiber reinforced resin Dion 9102-00 containing 0.6 wt % of a photoinitiator cured with low UV intensity of 0.008 W/cm2. In the layers of composite material, glass transition is determined by the onset of storage shear modulus (G') versus temperature (° C.) curve in a Dynamic mechanical analysis (DMA) graph (not shown). A top layer, indicated as layer #1 in the table, is closer to the radiation source (UV), with the subsequent layers indicated as layers #2, 5, 7 and 10 being positioned in the layer stack farther away from the radiation source (UV). The glass transition temperature of each layer, #1-#10, is obtained by exposing the composition to radiation of a wavelength made available from a UV radiation source to photocure the composition. As can be seen from FIG. 7, when cured with UV radiation alone, all the plies of composite material render low glass transition temperatures under low UV intensity with the top a few plies barely meeting low design specification requirements, but not optimal requirements.

FIG. 8 illustrates a temperature profile of a composite material, comprised of a plurality of layers, or plies, as indicated, generally similar to composite structure 110 of FIGS. 1-3. In this particular table, generally referenced 170, instead of a combined radiation source as disclosed herein, only a single high intensity UV radiation source was utilized for curing of the plurality of layers or plies. Specifically, illustrated in FIG. 8 is data reflecting high intensity UV curing of glass fiber reinforced resin Dion 9102-00 containing 0.6 wt % of a photoinitiator cured with a high UV intensity of 0.069 W/cm2. As previously described, in the composite material, glass transition is determined by the onset of storage shear modulus (G') versus temperature (° C.) curve in a DMA graph. A top layer, indicated as layer #1 in the table, is located closer to the radiation source (UV), with the subsequent layers indicated as layers #2, 5, 7 and 10 being positioned in the layer stack farther away from the radiation source (UV). The indicated data for layers #1-#10 show the temperature profile of the composite material obtained by exposing the composition to radiation of a wavelength made available from a high intensity UV radiation source to photocure the composition. As can be seen from FIG. 8, enhancing the UV intensity renders higher glass transition temperatures, but is limited to top a few layers. In addition, a significant and steady drop of the glass transition temperature is observed from the top to bottom plies.

FIG. 9 illustrates a temperature profile of a composite material, comprised of a plurality of layers, or plies, as indicated, generally similar to composite structure 110 of FIGS. 1-3. In this particular table, generally referenced 180, a combined radiation source, including an IR radiation source and a UV radiation source, was utilized for curing of the plurality of layers or plies. Specifically, illustrated in FIG. 9 is data reflecting the combination IR-UV curing of glass fiber reinforced resin Dion 9102-00 containing 0.6 wt % of a photoinitiator. The UV intensity is approximately 0.043 W/cm2, slightly lower than the UV intensity of the high UV intensity case shown in FIG. 8. The IR radiation source is turned off when the surface temperature of the multiple layers in the specimen reached 70° C. As indicated by the data obtained in FIG. 9, the combined UV-IR cure clearly renders uniform curing of the plies through the overall thickness, all with optimum high glass transition.

The disclosed combination ultraviolet (UV)-infrared (IR) manufacturing and repair system provides a desirable strength and potential for adhesive bonds in composite structures comprising resins as described in previous paragraphs. Joining and assembling of piece-parts and subcomponents into monolithic structures is particularly advantageous and useful for modular design. Although both mechanical and adhesively bonded joints may be used, adhesive bonds generally provide for lower weight designs and a desirable strength. Composite structures including resins may be used as materials in mechanical components for desirable adhesive bonding during joining and assembling of mechanical components.

FIG. 10 is a diagrammatical illustration of an exemplary embodiment of a composite structure 200, generally similar to a composite structure 110 of FIGS. 1-3, illustrating a wind turbine system 300 including at least a portion manufactured or repaired in accordance with embodiments disclosed herein. Some of the characteristics that make composites, such as fiberglass reinforced composites, suitable for wind turbine blades are desirable mechanical properties, tailorability of material properties, and versatility of fabrication methods. In addition, the fiberglass composites provide desirable toughness and shorter process cycle time than that known in existing manufacturing processes. The wind turbine system 300 includes a plurality of blades 302 (e.g., three blades). The blades 302 enable the system 300 to capture energy from the wind. Specifically, the wind forces the blades 302 to rotate about an axis, thereby driving an electrical generator disposed within the system 300. Long blades are desirable since it provides a big lever to capture desirable amounts of energy. In a non-limiting example, the blades 302 of the wind turbine system 300 have a typical length of less than 30 meters to maximize capture of energy and reduce cost of energy. Components of the blade 302 may comprise the composite structure 110 as discussed below. The blades 302 are coupled to a tower 304. The height of the tower, which determines height of the wind turbine system 300, plays a significant part in design of the wind turbine system 300. Due to change in velocity of wind with altitude, also known as wind shear, an optimum height is desirable for optimum performance of the wind turbine system 300. Generally, height of the tower 304 is about two to three times length of the blades 302 for an optimal performance.

FIG. 11 illustrates a modular design of a blade 302 as referenced in FIG. 10 of a wind turbine system 300 in which at least a portion is manufactured or repaired in accordance with certain embodiments of the present invention. The illustrated blade 302 includes a top skin 306 and a shear web 308 disposed between a pair of spar caps 310 that are coupled to a barrel 312. The shear web 308 provides desirable strength to the blade 302 and also provides desirable support to the pair of spar caps 310. The blade 302 further includes a bottom skin 314 disposed below the shear web 308. The pair of 112 of a fiberglass reinforced composite material manufactured or repaired according to the embodiments disclosed herein. Since the blade 302 is a significant component of the wind turbine blade system 300 as referenced to in FIG. 10, using a composite structure, such as composite structure 110 as referenced to in FIGS. 1-3 and described in the aforementioned embodiments, provides desirable mechanical strength to the turbine blade system 300, as well as a means of efficient and cost-effective repair and manufacture. Further, the top skin 306 and the bottom skin 314 may comprise additionally the composite structure.

Accordingly, disclosed is a UV-IR combination curing system and method for manufacture and repair of composite parts, such as wind blade manufacture and repair. The system and method utilize UV and IR dual radiation sources to cure glass fiber reinforced vinyl ester or epoxy laminates containing a photo initiator. The UV and IR dual radiation sources can be configured as discrete stand-alone UV and IR lamps used in a side by side configuration, a plurality of UV lamps with thermal IR radiation, a combined UV/IR lamp, or other forms of light sources providing both UV and IR radiation. To achieve high glass transition and complete curing of thick laminates, the IR radiation source is initially turned on to heat the laminate to close to 40° C.-100° C. before UV radiation source is turned on. The IR radiation source can be turned off after UV radiation source is activated. In addition, the UV-IR curing method may be used as a stagewise curing process to build up thickness as needed.

While only certain features of the invention have been illustrated and described herein, many modifications and changes will occur to those skilled in the art. It is, therefore, to be understood that the appended claims are intended to cover all such modifications and changes as fall within the true spirit of the invention. While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A method, comprising:
providing an uncured wind turbine blade consisting of a plurality of layers of a reinforced resin consisting of a resin having a reactive group, a reinforcing structure and a photoinitiator throughout a thickness of the plurality of layers of the uncured wind turbine blade, wherein the reinforcing structure consists of fiber particles comprising glass, silica, fumed silica, alumina, zirconium oxide, nanoparticles, or a combination thereof;
providing a first radiation source to heat the plurality of layers of the uncured wind turbine blade throughout a thickness of the plurality of layers of the uncured wind turbine blade;
heating the plurality of layers of the uncured wind turbine blade throughout the thickness of the plurality of layers by applying a first radiation from the first radiation source, thereby forming a plurality of pre-heated layers the uncured wind turbine blade;
providing a second radiation source to cure the plurality of pre-heated layers of the uncured wind turbine blade through a thickness of the uncured wind turbine blade; and
curing the plurality of pre-heated layers of the uncured wind turbine blade through the thickness of the uncured wind turbine blade to provide a cured wind turbine blade by applying a second radiation from the second radiation source, thereby forming a covalent bond across an interface of a first layer of the plurality of pre-heated layers and an adjacent successive layer of the plurality of pre-heated layers and a plurality of additional covalent bonds across additional interfaces of the plurality of pre-heated layers.

2. The method of claim 1, wherein providing a first radiation source comprises providing an infrared radiation source.

3. The method of claim 2, wherein providing a first radiation source comprises providing a radiation source emitting radiation having a wavelength in the range of 700 nm to 1 µm.

4. The method of claim 2, wherein providing a second radiation source comprises providing an ultraviolet frequency radiation source.

5. The method of claim 4, wherein providing a second radiation source comprises providing a radiation source emitting radiation having a wavelength in the range of 100 nm to 400 nm.

6. The method of claim 4, wherein providing a first radiation source and providing a second radiation source comprises providing a combined radiation source.

7. The method of claim 4, wherein providing a first radiation source and providing a second radiation source comprises providing a plurality of discrete stand-alone radiation sources.

8. The method of claim 4, wherein providing a first radiation source comprised providing a radiation source configured to heat the plurality of layers of the composite structure to a temperature in a range of 40-100° C.

9. A method of repairing a composite structure, comprising:
providing an uncured wind turbine blade consisting of a first layer of a reinforced resin consisting of a resin having a reactive group, a reinforcing structure and a photoinitiator, wherein the reinforcing structure consists of fiber particles comprising glass, silica, fumed silica, alumina, zirconium oxide, nanoparticles, or a combination thereof;
providing a plurality of successive layers of the uncured wind turbine blade consisting of the reinforced resin consisting of the resin having a reactive group, the reinforcing structure and the photoinitiator, the first layer and the plurality of successive layers configured in a stack, the uncured wind turbine blade consisting of the first layer and the plurality of successive layers;
providing a first radiation source configured to heat the first layer and the plurality of successive layers of the uncured wind turbine blade throughout a thickness of the plurality of layers of the uncured wind turbine blade;
applying a first radiation from the first radiation source to heat the first layer and the plurality of successive layers of the uncured wind turbine blade, forming a plurality of pre-heated layers of the uncured wind turbine blade;
providing a second radiation source configured to cure the plurality of pre-heated layers of the uncured wind turbine blade through a thickness of the plurality of pre-heated layers of the uncured wind turbine blade; and
applying a second radiation from the second radiation source to cure the plurality of pre-heated layers of the uncured wind turbine blade to provide a cured wind turbine blade, forming a covalent bond across an interface of the first layer and an adjacent successive layer and a plurality of additional covalent bonds across additional interfaces of the plurality of successive layers.

10. The method of claim 9, wherein providing a first radiation source comprises providing an infrared radiation source.

11. The method of claim 9, wherein providing a second radiation source comprises providing an ultraviolet frequency radiation source.

12. The method of claim 11, wherein the reactive group comprises unsaturated polyesters, vinyl esters, melamines, urea-formaledehydes, phenolics, methacrylate, acrylates, epoxies, urethanes, or a combination thereof.

13. The method of claim 11, wherein the photoinitiator comprises organic peroxides, azo compounds, quinones, benzophenones, nitroso compounds, acryl halides, hydrazones, mercapto compounds, pyrylium compounds, triacrylimidazoles, bisimidazoles, chloroalkyltriazines, benzoin ethers, benzil ketals, thioxanthones, acetophenones, acylphosphine oxides, or a combination thereof.

14. A method, comprising:
providing a first layer consisting of a reinforced resin consisting of a resin having a reactive group, a reinforcing structure and a photoinitiator, wherein the reinforcing structure consists of fiber particles comprising glass, silica, fumed silica, alumina, zirconium oxide, nanoparticles, or a combination thereof;
providing additional successive layers consisting of the reinforced resin consisting of the resin having a reactive group, the reinforcing structure and the photoinitiator;
applying a first radiation from a first radiation source to preheat the first layer and the additional successive layers throughout a thickness of the layers; and
applying a second radiation from a second radiation source to cure the preheated first layer and the plurality of additional successive layers simultaneously throughout a thickness of the layers, wherein a composite stand-alone blade of a wind turbine consists of the first layer and the additional successive layers.

15. The method of claim 14, wherein applying the second radiation from the second radiation source to cure the first layer and the successive additional layers comprises curing about 100% of the first layer and the successive additional layers throughout a thickness of the layers.

16. The method of claim 15, wherein the first radiation source comprises an infrared frequency radiation source emitting radiation having a wavelength in the range of 700 nm to 1 μm.

17. The method of claim 16, wherein the second radiation source comprises an ultraviolet frequency radiation source emitting radiation having a wavelength in the range of 100 nm to 400 nm.

* * * * *